United States Patent [19]

Jenkins et al.

[11] 4,064,841
[45] Dec. 27, 1977

[54] ROTARY ENGINE

[76] Inventors: Renaldo V. Jenkins, 1319 Bolton St., Norfolk, Va. 23504; Alexander P. Sabol, 143 Queens Drive, Williamsburg, Va. 23185

[21] Appl. No.: 715,608

[22] Filed: Aug. 18, 1976

[51] Int. Cl.² .............................................. F02B 55/14
[52] U.S. Cl. .................................... 123/8.47; 60/519; 418/37
[58] Field of Search ................. 123/8.47, 8.45; 60/519, 60/516, 518; 418/37

[56] References Cited

U.S. PATENT DOCUMENTS

| 2,547,374 | 4/1951 | Carideo | 418/37 |
| 3,312,200 | 4/1967 | Benson | 123/8.47 |
| 3,727,589 | 4/1973 | Scott | 123/8.45 |

FOREIGN PATENT DOCUMENTS

| 65,164 | 2/1950 | Netherlands | 418/37 |

*Primary Examiner*—Clarence R. Gordon
*Attorney, Agent, or Firm*—Wallace J. Nelson; Howard J. Osborn; John R. Manning

[57] ABSTRACT

A fully rotary engine adaptable to internal combustion or operation from an external heat source is provided wherein a drum-like housing containing a plurality of roller vanes contacts the inner surface thereof with the contact being maintained by a cylindrical inner race. At each end of the housing a torque plate, having a centerline offset from that of the housing and vane guide grooves which control the distance between each pair of roller vanes, transmits the rotation of the roller vanes to an output shaft running through the center of the torque plates. Rotation of the output shaft is provided by alternately increasing and decreasing the distance between adjacent roller vanes through expansion and contraction of a contained gas or through combustion and exhausting of a fluid/air mixture.

12 Claims, 4 Drawing Figures

ROTARY ENGINE

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The invention described herein relates generally to rotary devices and more specifically to rotary engines capable of employing either external or internal combustion to provide motive force.

A major disadvantage of the standard piston-type engine is its difficulty in operation at high rotational speeds. This is due to the inherent inefficiencies and vibration associated with transforming reciprocal motion into rotational motion.

Some problems of the piston engine have been minimized by present rotary engines. Their designs, however, have engendered problems of their own. For example, the Wankel engine and its variations, utilizing rotating lobes within an inner chamber to achieve intake, compression, expansion and exhaust require some type of tip or vane between the lobes and the inner chamber wall to define the work chambers within the engine. These vanes or tips are designed to slide either along the inner chamber wall or against the lobes. Such constant surface movement wears the vanes or tips causing the loss of chamber integrity, thereby reducing engine efficiency.

When an engine operated from an external heat source requires a membrane to separate the working medium from the heating or cooling medium, another disadvantage becomes evident. Heat transfer can be accomplished only by conducting through the membrane.

Furthermore, with the conservation of energy rapidly increasing in importance, an engine is undesirable if it cannot be easily adapted to a variety of energy sources, for example coal, geothermal heat and gasoline.

Therefore, there is a definite need in the art for an engine which is easily adaptable to a variety of modes of operation, which is capable of high rotational speeds and which is not subject to poor chamber definition. Furthermore, there is a definite need for an engine operable from an external heat source which does not require a membrane to separate the working medium from that used to cool or heat.

It is therefore an object of the present invention to provide an engine of fully rotational design.

It is a further object of the present invention to provide an engine adaptable to internal combustion as well as being operable using an external heat source.

It is another object of the present invention to provide an engine minimizing seal wear and poor chamber definition.

It is an additional object of the present invention to provide an engine capable of operation from an external heat source which does not require separation of the working medium from the heating or cooling medium.

SUMMARY OF THE INVENTION

These and other objects of the present invention are obtained by providing a rotary engine which minimizes the disadvantages of prior art engines and offers a novel chamber-to-output shaft configuration and, where the engine is operated from an external heat source, which is capable of a droplet heat transfer mode of operation, requiring no separation membrane.

Specifically, the present invention utilizes a drum-like housing defining a cylindrical main chamber. Rotatable torque plates reside in recesses on each end of the housing. The two torque plates are connected by a centralized output shaft such that they rotate as an assembly. The axis of rotation of the assembly is offset from the centerline of the main chamber. Roller vanes are held in constant contact with the main chamber wall by a rotationally independent inner race. The roller vanes have guides at each end which slidably connect the vanes to the torque plates by residing in equally spaced grooves radially disposed in star-like fashion about the inner face of the torque plates.

Rotation of the roller vanes causes them to roll along the surface of the main chamber wall and, because of the offset between the centerline of the chamber and axis of rotation of the torque plate, to translate along the radial grooves cut in the torque plates as well. Each pair of rollers are thus alternately drawn together and forced apart as they move back and forth along the grooves resulting in a volume change within the defined chamber.

In operation, each chamber contains a working fluid. Where the housing is designed for external combustion, the working fluid is alternately compressed and cooled then expanded by introduction of a heat transfer medium having a higher temperature than the compressed working fluid.

Where the housing is designed for internal combustion, the working fluid is alternately compressed by mechanical work then expanded by combustion.

In either case, the working fluid forces adjacent roller vanes apart then permits the vanes to be drawn together so that the process can be repeated. Such relative movement of the roller vanes can only be accomplished by their rotation about the inner surface of the housing in conjunction with their translation along the torque plate grooves resulting in rotation of the output shaft.

As an external combustion engine, the invention can be operated in any of the major known cycles such as Otto, Sterling, Brayton or a Carnot approximation by altering the amount and/or location of the cooled or heated fluid injected.

As an internal combustion engine, the invention can operate on either the Otto or Diesel cycle and, in addition, each cycle can be altered by selectively positioning the intake and exhaust ports or the point of ignition. Furthermore, the design and number of ports can be chosen so as to permit a programed flow of the working fluid.

Because the invention operates in a fully rotational sense, the engine has the potential for operation at speeds far in excess of a reciprocating engine. Because of the lower inertial loads experienced by the present invention, its structure can be made much lighter. Thus, a more easily fabricated and less costly engine would result.

By incorporating the rolling vanes as opposed to prior art sliding vanes, the rotary mechanism is designed so as to offer friction advantages over prior art rotary engines resulting in reduced wear and increased performance.

A more complete appreciation of the invention and many of the attendant advantages thereof will be readily apparent as the same becomes better understood by reference to the following detailed description when considered in connection with the accompanying drawings wherein:

DETAILED DESCRIPTION

Figure 1:
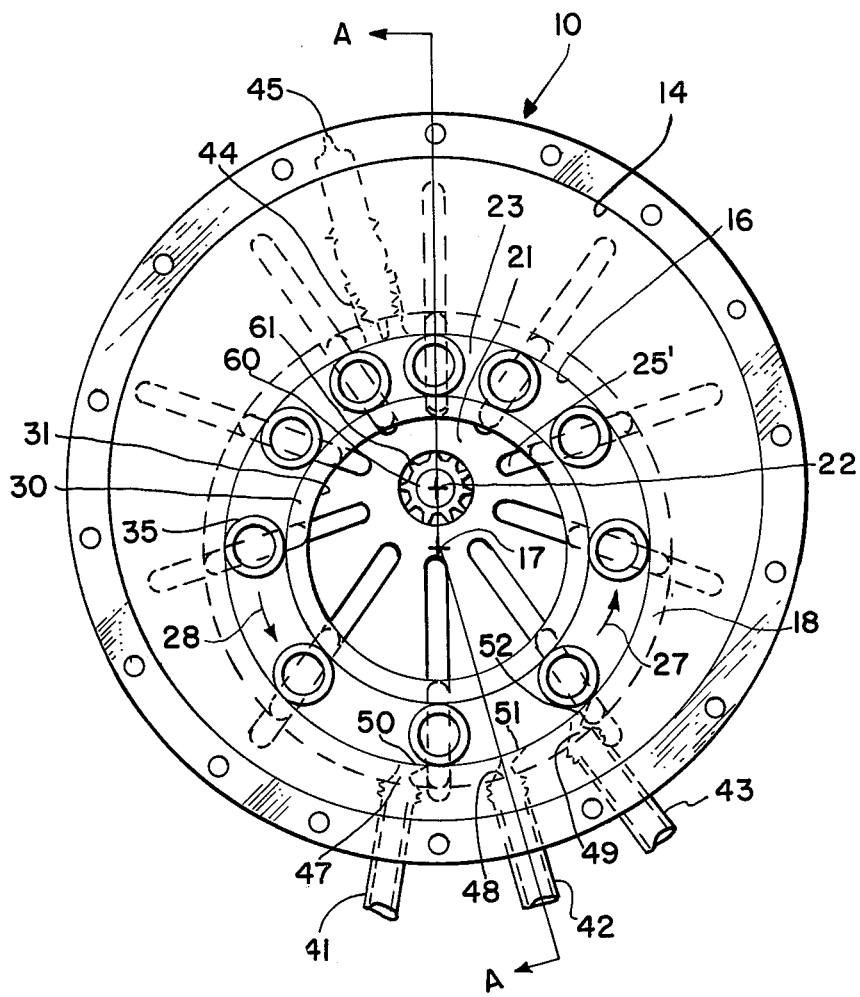
FIG. 1 is a front view of the invention, with the front end plate and torque plate removed, for operation in an internal combustion mode.
Figure 2:
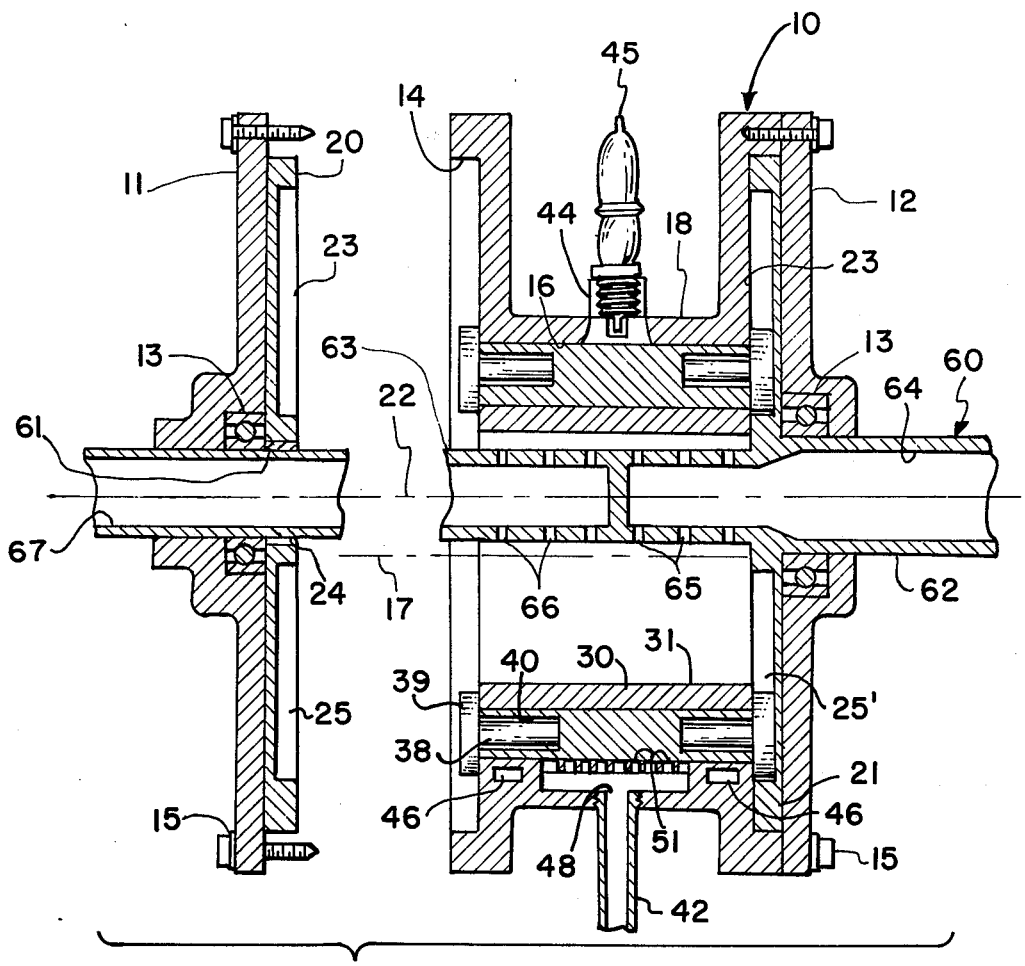
FIG. 2 is a side view section taken along line A—A of FIG. 1.

Referring now to the drawings wherein like reference numerals designate identical parts throughout the several views, and more particularly FIG. 1 and 2, there is shown an engine of fully rotary design.

The main body or housing generally designated as 10 supports all other members. In FIG. 1, the front end plate 11 and front torque plate 20, which are shown in FIG. 2, are removed to display the internal components of the invention. End plates 11 and 12 incorporate a low-friction bearing and seal assembly 13 which supports torque plates 20 and 21 by a concentric output shaft generally designated as 60 in housing recess 14. Torque plates 20 and 21 are properly machined and lubricated to freely rotate within housing recesses 14 about axis of rotation 22. Torque plates 20 and 21 are restrained from leaving recesses 14 by end plates 11 and 12 secured to housing 10 by conventional bolt and washer combinations 15.

Housing 10 is of drum-like construction with a cylindrical main chamber defined by inner housing surface 16 having a centerline 17 offset a determined distance from the output shaft/vane guide plate axis of rotation 22.

As shown more particularly in FIG. 2, where the engine is to operate in an internal combustion mode, housing shroud 18 contains coolant jacket 46. In the preferred embodiment, housing shroud 18 is penetrated by four ports 41, 42, 43, and 44. Port 44 terminates at housing inner surface 16 and contains, in the preferred embodiment, a spark plug 45 for igniting the working fluid. Alternately, port 44 can contain a glow plug or can terminate in a header volume having orifices on the housing inner surface for injection of a catalyst; both alternatives causing combustion of the working fluid. Ports 41, 42, and 43 terminate in separate header volumes 47, 48, and 49, respectively, having lines of subports 50, 51, and 52, respectively, on housing inner surface 16. The ports, header volumes and subports being of identical construction, for clarity only port 42 having header volume 48 and subports 51 is shown in FIG. 2.

The inner race 30, positioned within the main chamber, is rotationally independent of the housing inner surface 16 as well as inner face 23 of the torque plates 20 and 21. As shown in FIG. 1, race 30 is of open drum-like construction, defining a gallery by its inner surface 31. Output shaft 60, formed as an integral part of rear torque plate 21, passes through the gallery to join and position the front torque plate 20 by engagement of splined shaft section 61 with splined opening 24. Thus, both torque plates 20 and 21 rotate as a unitary body within recesses 14.

Figure 3:
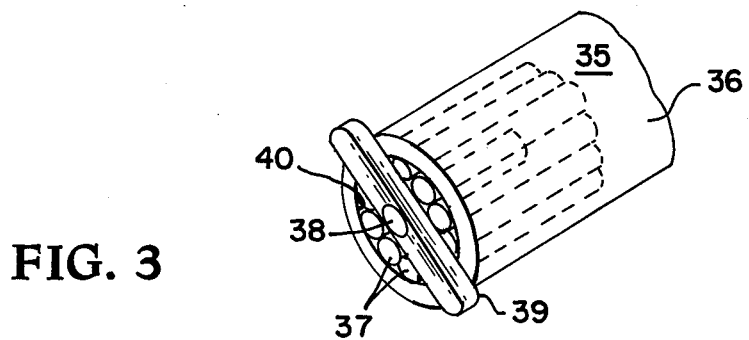
FIG. 3 is a perspective of an end of one roller vane assembly showing in phantom the needle bearings and race supporting the sliding guide.

Also contained within the housing opening are ten roller vanes, one of which is designated by reference numeral 35 and the others not designated, positioned between inner housing surface 16 and inner race 30. Inner housing surface 16, inner race 30 and the roller vanes are dimensioned such that the roller vanes always remain in contact with both inner housing surface 16 and race 30. As more clearly shown in FIG. 3, roller vane 35 is actually an assembly, as are all other roller vanes, composed of a cylindrical roller 36 having a cylindrical recess 40 at each end which acts as an outer race for a plurality of needle bearings 37. Needle bearings 37 in turn support sliding guide 39 by pin race 38. confined to travel within grooves 25 and 25' disposed radially about inner face 23 of torque plates 20 and 21, respectively. Torque plates 20 and 21, roller vanes 35 and output shaft 60 thus rotate as a unitary assembly.

Output shaft 60 is made up of drive section 62 and torque plate connecting section 63. Where the engine is to operate in the internal combustion mode, inlet jacket 64 contained by drive section 62 and connecting section 63 has inlet ports 65 on the surface of connecting section 63. During operation of the engine, cooling fluid such as a conventional glycol and water combination is introduced through inlet jacket 64 and inlet ports 65 into the gallery defined by the inner surface 31 of race 30. The cooling fluid is thereafter released through discharge ports 66 on connecting section 63 to discharge jacket 67 also contained by connecting section 63 then to a cooling and recirculating unit (not shown) such as a conventional automotive radiator, fan and pump arrangement.

Each pair of adjacent roller vanes, inner race 30, main chamber surface 16 and torque plates 20 and 21 define a work chamber within which a working fluid may act.

Referring again to FIGS. 1 and 2, it can be seen that the engine operates in the internal combustion mode as follows. Torque plates 20 and 21, the roller vanes and output shaft 60 rotate as a unitary assembly. As torque plates 20 and 21 rotate about axis 22 the proximity of adjacent roller vanes is altered by the action of sliding guides 39 moving along grooves 25 and 25'. In the vicinity of port 41 adjacent pairs of roller vanes are separated to the maximum extent. In the vicinity of port 44 the adjacent roller vanes are separated to the minimum extent. Thus, the volume of the work chamber between the roller vanes reduces as the vane guide plates rotate approximately 180°. Thus, the compression of a confined working fluid can be effected. This is comparable to the action that occurs in a reciprocating engine as a piston moves up its stroke.

Combustion of the working fluid in the vicinity of port 44, resulting from ignition of spark plug 45, forces the roller vanes bounding port 44 apart.

Such combustion causes the roller vanes, inner race 30 and torque plates 20 and 21 to rotate in the counterclockwise direction as viewed in FIG. 1.

To start the engine, a starting mechanism (not shown) such as a conventional automotive starter using a field coil and armature connected to a toothed starter dog, is used to turn output shaft 60, the rotation of torque plates 20 and 21 thus being effected. The roller vanes are thereby urged to rotate about the housing inner surface 16 by sliding guides 39 interacting with torque plate grooves 25 and 25'. The starting mechanism continues to provide the motive force for the engine until such time as internal combustion is begun and vane rotation becomes self-sustaining.

In order to more fully appreciate the operation of the present invention, a single engine operational cycle is described. For clarity, only one work chamber and the attendant components which define the work chamber are discussed as passing through each of the various phases of the cycle. Nonetheless, every other work chamber sequentially duplicates the action of the one discussed. Thus, all phases of the engine operational cycle occur simultaneously, albeit each may involve a separate and distinct work chamber.

A cycle is begun by the introduction of pressurized air into the work chamber as it is exposed to the subports 51 fed from port 42. In the preferred embodiment, the air is pressurized, for example, by a conventional supercharger (not shown), before introduction into port 42. As the work chamber continues to revolve in a counterclockwise direction, it is exposed to the subports 52 connected to port 43. In the preferred embodiment the working fluid is introduced through port 43 from a conventional fuel injection system (not shown). The fuel injection system in conjunction with the configuration and size of the subports 52 control the efficiency of the engine in combusting the working fluid. Gasoline is utilized as the working fluid in the preferred embodiment, however, it is recognized that other fluids such as ether, alcohol, or kerosene are usable.

Further rotation of torque plates 20 (not shown in FIG. 1) and 21 causes the adjacent pair of roller vanes bounding the chamber to rotate in the direction of arrow 27 along inner housing surface 16 and furthermore translate along torque plate grooves 25 (not shown in FIG. 1) and 25' toward axis of rotation 22, thus compressing the gasoline and air mixture. As the work chamber is exposed to port 44, combustion of the mixture is initiated by ignition of spark plug 45, for example by a conventional automotive ignition system (not shown). Considering the adjacent pair of roller vanes 35 in the direction of rotation, the combustion of the working fluid causes a rise in gas pressure which forces the leading vane out along torque plate grooves 25 (not shown in FIG. 1) and 25', the leading roller vane being further from axis of rotation 22 than the trailing vane at the time of ignition. Such translation can only be accomplished by rotation of the leading roller vane in the direction of arrow 28 along inner surface 16 away from axis of rotation 22. This translation and rotation urges torque plates 20 (not shown in FIG. 1) and 21 to rotate in a counterclockwise direction resulting in a net torque on output shaft 60. The rotation of shaft 60 thereby yields useful work for any external use.

Further rotation of output shaft 60 exposes the work chamber to subports 50, header volume 47 and exhaust port 41 whereby combustion products are communicated from the work chamber. Additional rotation of the members exposes the work chamber to subports 51, associated header volume 48 and pressurized air inlet port 42. Subports 50 and 51 are positioned such that the work chamber is simultaneously exposed to both for a brief interval. Thus, pressurized air from inlet port 42 scavenges residual exhaust gases from the work chamber, forcing the gases to exhaust through port 41. Further rotation of the members such that port 41 is no longer exposed causes the work chamber to be again charged with air. One cycle is thus completed and a second begun. Since each work chamber sequentially duplicates the action of the one discussed, combustion therein sustains continual rotational action of the engine.

Figure 4:
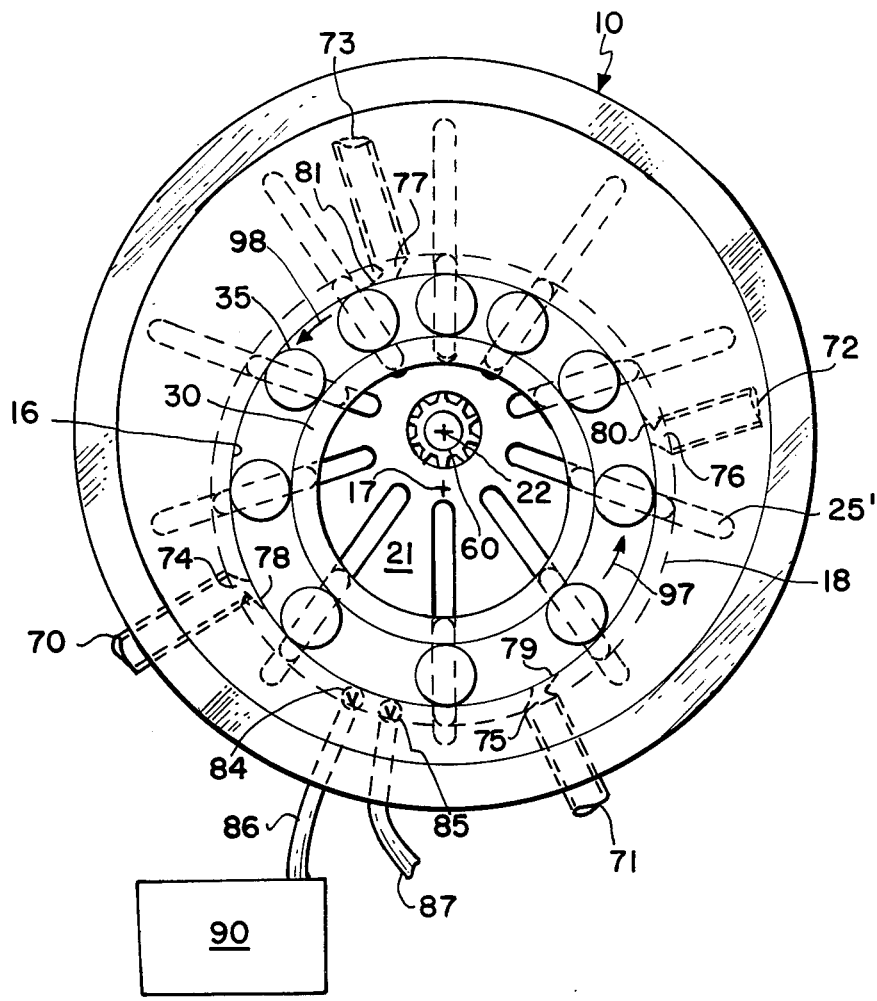
FIG. 4 is a front view of the invention, with the front end plate and torque plate removed, for operation from an external heat source.

Referring now to FIG. 4, the structure and operation of the present invention when operated from an external heat source will be discussed. Briefly, operation is based upon communication of heat from an external source by a transfer medium to a working fluid contained in each work chamber of the engine. The resulting expansion of the working fluid causes rotation of the engine output members. A second transfer medium removes heat from the previously mentioned working fluid causing contraction of the working fluid and an associated reduction in the energy required to compress the working fluid so that it can again be expanded.

In the preferred embodiment, the working fluid is pressurized helium contained in each work chamber defined by inner housing surface 16, inner race 30, each adjacent pair of roller vanes, and torque plates 20 (not shown) and 21. Helium was chosen based upon its inert nature, its specific heat ratio of 1.67 and its large specific gas constant. Water is used as the transfer medium for communication of heat to the working fluid to cause its expansion and also as the transfer medium for communication of heat from the working fluid to cause its contraction. Heat transfer within the engine is effected by injection of the water in droplet form directly into the work chamber. This direct interaction of the working fluid with the heat transfer medium, requiring no heat conduction through a separating membrane, is referred to herein as droplet heat transfer.

In order for the engine to perform effectively, a large temperature differential must exist between the water used for expansion and that used for contraction of the working fluid. In the preferred embodiment, the water used for expansion, hereinafter referred to as the hot water, has a temperature in the range of 250° F to 575° F. and a pressure of 85 atmospheres. The water used for contraction hereinafter referred to as the cooling water, has a temperature in the range of 32° F. to 200° F. and is also pressurized for injection. In the preferred embodiment the external heat source communicating the hot water to the engine consists of a high pressure boiler, while the external source of the cooling water consists of a water storage tank from which water is communicated by a conventional pump. Inasmuch as these details are considered conventional components well known in the art and with equivalent structures readily available they have been omitted in the interest of clarity.

In the preferred embodiment, a Carnot cycle is approximated. Therefore, housing 10 contains hot water outlet port 70, cooling water inlet port 71, cooling water outlet port 72, and hot water inlet port 73 having separate header volumes 74, 75, 76 and 77, respectively, and nozzles 78, 79, 80 and 81, respectively. Additionally, a bleed-in valve 84 connected by conduit 86 to a pressurized helium source 90 and a bleed-off valve 85 connected to exhaust conduit 87 and exhausting to the atmosphere penetrate housing shroud 18 to terminate as orifices on housing surface 16. All other members are identical to the embodiment shown in FIG. 1, 2 and 3 and bear corresponding numerals.

In operation, a start mechanism (not shown) such as that described for internal combustion operation is used to turn output shaft 60, the rotation of torque plates 20 and 21 thus being effected. The roller vanes are thereby urged to rotate about housing inner surface in the direction of arrows 97 and 98. As the speed of the engine is increased, bleed-in valve 84, connected by line 86 to a pressurized source of helium 90 is opened as well as bleed-off valve 85 having vent line 87. The position of bleed-in valve 84 and bleed-off valve 85 at their orifices on inner housing surface 16 is such that, for a brief interval, each work chamber is concurrently exposed to both. Thus, any contained air is forced from the work chambers. After a suitable flushing interval, bleed-off valve 85 is closed causing each work chamber to be charged with pressurized helium whereupon bleed-in valve 84 is likewise closed.

In order to more fully appreciate the operation of the present invention, a single engine operational cycle is described. For clarity, only one work chamber and the attendant components which define the chamber are discussed as passing through each of the various phases of the cycle. Nonetheless, every other work chamber sequentially duplicates the action of the one discussed. Thus, all phases of the engine operational cycle occur simultaneously, albeit each may involve a separate and distinct work chamber.

Once operational rotational speed has been reached, 5500 to 7000 RPM in the preferred embodiment, a cycle is initiated by the injection of high pressure cooling water through inlet port 71 to the row of nozzles, or subports 79, where it is sprayed into the work chamber. The spray can only reach the work chamber when subports 79 are located between the roller vanes which bound the work chamber under consideration.

The cooling water readily absorbs heat and thus maintains the helium in the chamber at a constant temperature permitting an isothermal compression of the helium by movement of the roller vanes 35 in a counter-clockwise direction. As the trailing vane passes over the nozzles 79 the isothermal compression ends and an isentropic compression begins. The water containing the absorbed heat is thrown out against surface 16 by centrifugal force where it provides a liquid film for the roller vanes 35 to ride on. The water contained in the film is pushed in front of the trailing vane until exit subports 80 leading to outlet port 72 are reached. Here the water is removed to a conventional heat exchanger system (not shown) where heat is dissipated after which the water is returned to the cool water inlet port 71 via the cooling water source.

The helium in the chamber, with the cooling water removed, is further isentropically compressed by rotation of the roller vanes and their associated relative movement toward one another resulting from their rotation in the direction of arrow 97 along surface 16 and consequent translation along grooves 25 (not shown) and 25' toward axis of rotation 22 to the position where the leading roller vane is directly over the row of hot water inlet nozzles, or subports 81 connected to hot water inlet port 73. Considering the adjacent pair of roller vanes in the direction of rotation, as the leading roller vane for the chamber passes over the row of nozzles 81, high pressure hot water is sprayed into the chamber.

The resulting isothermal expansion of the helium acts upon the roller vanes bounding the work chamber forcing them apart. Since the leading roller vane is further away from axis of rotation 22 than the trailing vane the expansion causes the leading vane to translate out along grooves 25 (not shown) and 25' which can be accomplished only by rotation of the leading roller vane in the direction of arrow 98 along inner surface 16. This rotation and accompanying translation urges torque plates 20 (not shown) and 21 to rotate in the direction of arrow 98 resulting in a net torque on output shaft 60. Shaft 60 then yields useful work for any external use.

Further rotation of shaft 60 and vane guide plates 20 (not shown) and 21 causes the trailing vane to pass over the row of nozzles 81 at which time the isothermal expansion ends and an isentropic expansion begins. Expansion of the helium continues to force the adjacent roller vanes apart thus continuing to yield useful work. Due to the centrifugal force generated by the rotational speed of the roller vanes, the hot water is now pushed along inner housing surface 16 in front of the trailing roller vane until outlet port 70 is reached where the water is removed through subports 78 to the heat source (not shown), reheated and returned for injection through port 73. As the trailing vane of the chamber passes outlet port 70, a single cycle is complete and a second begun. Since each work chamber sequentially duplicates the action of the one discussed, expansion therein sustains the rotational action of the engine.

This method of operation would seem to have an attendant disadvantage in that the helium would migrate from the engine through the various inlet and outlet ports thus resulting in the absence of a working fluid. However, by operating the engine at a speed causing the injected water to remain against the inner housing surface, 5500 to 7000 RPM in the preferred embodiment, and by completely filling the heating and cooling systems with water, the loss of helium is minimized by its isolation from the ports. Alternatively, the engine can be charged with sufficient helium to allow some in the cooling and heating systems.

An alternate method of operation from an external heat source is to compress the helium to a high temperature, for example 1000 to 1990° F., and inject superheated steam for the isothermal expansion. The steam being dry would not condense in time to pass through outlet port 70. Thus outlet port 70 could be eliminated. While the droplet heat transfer method of operation from an external heat source has been achieved with a piston-type engine, the application of droplet heat transfer to a rotary engine is believed in itself unique. Furthermore, operation of a conventional vane-type rotary engine from an external heat source while not described herein, would be easily achieved in light of the above teachings. In fact, the water film utilized along the inner housing surface of the present invention would reduce wear of the vane tips in conventional sliding vane type rotary engines.

Although the preferred embodiments have described the roller vanes as being ten in number, clearly this number may be increased or decreased without changing the spirit or scope of the present invention. In the external mode of operation, a heat transfer medium other than water, such as "Therminol" by Monsanto or "Dowtherm" by Dow Corning, may be used to increase temperature differential or otherwise modify the operational temperatures of the engine. Also, in the internal combustion mode of operation, ignition of the working fluid is not limited to a spark plug, but could result from a conventional glow plug, a mixture which would chemically react and ignite the working fluid or other conventional ignition devices. Obviously, other modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A rotary engine comprising:
   a drum-like housing having a cylindrical inner surface bounded at each end by a circular recess extending beyond the circumference of said inner surface,
   the center of said circular recesses being offset from the centerline of said inner surface,
   a flat circular torque plate having an inner and outer face positioned for relative rotative movement in each said circular recess,
   end plates affixed to each end of said housing maintaining said torque plates in position,
   an output shaft extending through said housing having an axis of rotation concentric with said housing circular recesses and fixedly connecting said torque plates to rotate as a unit such that said axis of rotation is more proximate to one location on said housing inner surface than to any other,
   a first plurality of evenly spaced grooves extending radially from the center of said inner face of one of said torque plates,
   a second plurality of evenly spaced grooves extending radially from the center of said inner face of the other of said torque plates, said second plurality of grooves being equal in number to said first and directly opposed thereby,
   a plurality of cylindrical roller vanes extending the length of said inner housing surface and free to turn thereon, each said roller vane having a first end in one of said first plurality of grooves and a second end disposed in said directly opposed groove in the other of said torque plates,
   a cylindrical surface extending the length of said inner housing surface holding said roller vanes in constant contact thereagainst such that said inner housing surface and said cylindrical surface define respectively an outer and inner race for said roller vanes,
   a slidable rotatable connection between the ends of said roller vanes and said torque plate grooves such that said vanes are freely rotatable against said outer and inner races and translatable along said grooves where said vanes revolve about said inner housing surface and the members of adjacent vane pairs contemporaneously vary in separation between a minimum and a maximum determined by said offset between said axis of rotation of said torque plates and said centerline of said housing inner surface in conjunction with the proximity of each vane to said axis of rotation;
   a plurality of work chambers individually defined by said inner surfaces of said torque plates, said inner and outer races and a pair of adjacent roller vanes, said work chambers having variable individual volumes directly proportional to the separation of the members of said adjacent roller vane pairs;
   a working fluid capable of expansion and contraction;
   means for introducing said working fluid sequentially into each of said work chambers;
   means for rotating said torque plates such that said adjacent roller vanes bounding said work chambers containing said working fluid rotate along said inner housing surface and translate along said torque plate grooves toward said axis of rotation until substantially minimum separation of said adjacent rollers is reached whereby said contained fluid is compressed and, considering said adjacent pairs of roller vanes in the direction of rotation, the leading member of said pair exceeds the trailing member in distance from said axis of rotation;
   means for sequentially expanding said working fluid attaining such compression such that the resulting pressure and the relative position of said vanes to said axis of rotation forces said leading vane away from said trailing vane by continued rotation along said inner housing surface and translation along said torque plate grooves away from said axis of rotation thereby rotating said torque plates and said output shaft by the force of said slidable rotatable connections in said torque plate grooves; and
   means for sequentially returning said work chambers to a condition whereby compression of said contained working fluid is begun anew.

2. The rotary engine of claim 1 wherein said rotatable connection between the ends of said roller vanes and said torque plate grooves is comprised of:
   a sliding member positioned in said torque plates grooves for slidable translation along said torque plate grooves;
   a cylindrical race fixedly connected to said sliding member;
   a concentric cylindrical recess in each end of said roller vanes;
   a plurality of roller bearings disposed about said concentric cylindrical recess and held in constant contact by said cylindrical race such that said roller vanes are rotatably independent of said sliding members and such that said sliding members are translatable along said torque plate grooves.

3. The rotary engine of claim 1 and operable in an internal combustion mode, wherein the means for introducing said working fluid sequentially into each of said work chambers is comprised of:
   a first plurality of orifices extending through said housing inner surface;
   a first external port on said housing;
   a first cavity contained by said housing and connecting said first plurality of orifices and said first external port such that said working fluid communicates from said first external port through said first cavity and is sequentially sprayed into said work chambers through said orifices as each said chamber is exposed to said orifices.

4. The engine of claim 3 wherein the means for sequentially expanding said working fluid is comprised of:
   an orifice extending through said housing; and
   a conventional spark plug extending into said orifice and attached thereto.

5. The engine of claim 3 wherein the means for sequentially returning said work chambers to a state where compression of said working fluid is begun anew is comprised of:
   a second plurality of orifices extending through said housing inner surface;
   a second external port on said housing;
   a second cavity in said housing between said second plurality of orifices and said second port such that combustion products of said working fluid sequentially exit from said work chambers through said second plurality of orifices into said second port for communication away from said engine;
   a third plurality of orifices extending through said housing inner surface;

a third external port on said housing;

a third cavity in said housing between said third plurality of orifices and said third port;

said third port and said third plurality of orifices positioned such that each said work chamber is concurrently exposed to both said second and said third plurality of orifices for a period whereby each said work chamber is in sequence scavenged of residual combustion products by air communicating from said third port through said third cavity and introduced into said work chambers through said third plurality of orifices forcing said residual combustion products to exit from each said work chamber through said second plurality of orifices into said second port.

6. The rotary engine of claim 1 and operable from an external heat source wherein said working fluid comprises helium in a pressurized state contained in each said work chamber and wherein water is used as a heat transfer medium between said external heat source and said helium.

7. The rotary engine of claim 6 wherein the means for rotating said torque plates and compressing said working fluid is comprised of:

a first plurality of orifices on said housing inner surface;

a first external port on said housing, said first external port being in fluid communication with a first pressurized water supply;

a first cavity in said housing between said first plurality of orifices and said port such that the pressurized water used as a cooling medium is sprayed in sequence into each said work chamber filled with said working fluid causing an isothermal compression of said working fluid until said trailing member of each said pair of adjacent roller vanes passes over said first plurality of orifices changing said isothermal compression to an isentropic compression;

a second plurality of orifices on said housing inner surface;

a second external port on said housing;

a second cavity in said housing between said second plurality of orifices and said second port such that said water spraying into each said work chamber is substantially removed by centrifugal force of rotation acting against said water forcing it against said inner chamber wall in conjunction with said trailing member of each said pair of adjacent roller vanes forcing said water into said second plurality of orifices for communication through said second cavity through said second port to said external heat source.

8. The rotary engine of claim 7 wherein the means for sequentially expanding the helium working fluid comprises:

a third plurality of orifices on said housing inner surface;

a third external port on said housing; said third external port being in fluid communication with a second pressurized water supply having a temperature in excess of that for the water supply in fluid communication with said first external port;

a third cavity in said housing between said third plurality of orifices and said third port such that the water is sprayed sequentially into each said work chamber exposed to said third plurality of orifices thereby causing an isothermal expansion of said contained helium working fluid until said trailing member of each said pair of adjacent roller vanes passes over said third plurality of orifices changing said isothermal expansion to an isentropic expansion.

9. The rotary engine of claim 8 wherein the means for sequentially returning said work chambers so compression of said contained helium working fluid is begun anew is comprised of:

a fourth plurality of orifices on said housing inner surface;

a fourth external port on said housing;

a fourth cavity in said housing between said fourth plurality of orifices and said fourth port such that said water used as a heating medium sprayed into each said work chamber is substantially removed by the centrifugal force of rotation acting against said water forcing it against said inner chamber wall in conjunction with said trailing member of each said pair of adjacent roller vanes forcing said water into said fourth plurality of orifices for communication through said cavity through said port to said external heat source.

10. The rotary engine of claim 8 wherein said first external port is in fluid communication with a pressurized water supply having a temperature in the range of 32° to 200° F. and said third external port is in fluid communication with a pressurized water supply having a temperature in the range of 250° to 575° F.

11. The rotary engine of claim 7 wherein the means for sequentially expanding the helium working fluid comprises:

a third plurality of orifices on said housing inner surface;

a third external port on said housing, said third external port being in communication with a dry steam supply having a temperature in the range of 1000° F. to 1990° F.;

a third cavity in said housing between said third plurality of orifices and said third port such that dry steam is sprayed sequentially into each said work chamber exposed to said third plurality of orifices thereby causing an isothermal expansion of said contained helium working fluid until said trailing member of each said pair of adjacent roller vanes passes over said third plurality of orifices changing said isothermal expansion to an isentropic expansion.

12. The rotary engine of claim 1 and operable from an external heat source wherein the means for expanding and contracting said working fluid is comprised of water in droplet form introduced in direct interrelation with said working fluid contained in each said work chamber.

* * * * *